United States Patent [19]
Miller et al.

[11] Patent Number: 5,758,400
[45] Date of Patent: Jun. 2, 1998

[54] WEATHERSTRIPPING INSERTION MACHINE AND METHOD

[75] Inventors: Donald G. Miller, 2606 Harland Dr., Hudson, Ohio 44236; Jerry N. Snider, Robinson, Ill.

[73] Assignee: Donald G. Miller, Hudson, Ohio

[21] Appl. No.: 667,443

[22] Filed: Jun. 21, 1996

[51] Int. Cl.[6] .................................................. B23P 19/02
[52] U.S. Cl. ............................... 29/451; 29/235; 29/417
[58] Field of Search ............................ 29/235, 417, 451

[56] References Cited

U.S. PATENT DOCUMENTS

| | | | |
|---|---|---|---|
| 3,027,629 | 4/1962 | Wrightfield | 29/235 |
| 3,295,195 | 1/1967 | Burgio | 29/417 X |
| 3,335,487 | 8/1967 | Ellenberg et al. | |
| 4,308,653 | 1/1982 | Hinton et al. | 29/451 X |
| 4,377,893 | 3/1983 | Buonanno | 29/235 X |
| 4,528,736 | 7/1985 | Hope et al. | |
| 5,018,264 | 5/1991 | Kautt | 29/235 X |
| 5,103,547 | 4/1992 | Holloway et al. | 29/451 |

OTHER PUBLICATIONS

Tol–O–Matic, Inc. Parts Sheet BC2 Series™ Band Cylinder® BC215/BC2M(M)15.

*Primary Examiner*—Daniel Moon
*Attorney, Agent, or Firm*—Fay, Sharpe, Beall, Fagan, Minnich & McKee

[57] ABSTRACT

A plurality of lengths of window or door framing material which have weatherstrip receiving channels are disposed on a support surface (10). An operator controls (14) a carriage (16) to move from a home position to the opposite end of the support surface. The operator takes free ends of strips (18) of weatherstripping which extend through a pinch roller assembly (22). A portion of each strip near the free end is inserted into the channel manually and the free end is clamped (50, 52) in the carriage. When all the strips are started, the operator changes the differential pressure across the piston of a rodless cylinder (34) returning the carriage to its home position pulling the weatherstripping through the channels. At the home position, the carriage releases the free ends of the weatherstripping and the operator cuts the weatherstripping adjacent the pinch roller assembly. The framing material with inserted weatherstripping is removed from the support surface and the process repeated.

19 Claims, 4 Drawing Sheets

WEATHERSTRIPPING INSERTION MACHINE AND METHOD

BACKGROUND OF THE INVENTION

The present invention relates to the art of inserting ribbons of flexible material into channels. It finds particular application in conjunction with the insertion of pile weatherstripping into channels in window frames and will be described with particular reference thereto. It is to be appreciated, however, that the invention will also find application in conjunction with the insertion of other types of weatherstripping in window and door frames, as well as the insertion of other types of ribbon material into other types of channels.

Windows and doors are commonly constructed of a frame material such as aluminum, vinyl, wood, or the like. The frame material commonly is manufactured in long lengths. Typically, a channel is formed along one edge of the lengths within which weatherstripping is to be received. In order to accommodate the many different styles and sizes of windows and doors sold today, the framing material is available in a myriad of different sizes and profiles. Even the channels come in many different shapes and sizes to accommodate a large number of types and styles of weatherstripping.

The window or door manufacturer buys the weatherstripping in large rolls and the framing material in long, stock lengths. Typically, human labor is used to insert the weatherstripping into the channel. For example, a worker might set a stock length of the framing material on a work surface and roll out a similar length of weatherstripping. Using an elementary tool, such as a roller, the worker presses the weatherstripping into the beginning of the channel. The strip is then pulled the length of the channel. It is to be appreciated that the hand insertion of weatherstripping is highly labor intensive.

An attempt at reducing the labor intensity of weatherstripping insertion is illustrated in U.S. Pat. No. 4,528,736 of Hope and Brown. The illustrated device in the patent provided a tool, similar to a zipper, which guided the weatherstripping to the channel and inserted it with a roller. The zipper-like member was moved manually by the operator. Among the drawbacks are the difficulty encountered when changing widths and thicknesses of weatherstripping material. Moreover, skilled weatherstripping inserters found that they could insert weatherstripping just as easily using only the roller tool, eliminating any potential labor savings.

Others have attempted to automate the weatherstripping insertion process. In one attempt, a die was positioned at one end of the stock framing material. An end of the weatherstripping was fed through the die and pushed into the channel. A machine continued to push weatherstripping until weatherstripping was pushed through the entire length of each framing material length. As is to be appreciated, pushing ribbon-like weatherstripping proved less than reliable. Jamming, kinks or twists in the weatherstripping, and similar problems were incurred. The manual labor involved in monitoring this insertion process against failures proved to be almost as labor intensive as hand insertion. Moreover, additional manual labor was required to remove the weatherstripping which had failed to feed through the entire length of the framing material or otherwise correct for defective weatherstripping insertion operations.

The present invention provides a new and improved insertion apparatus and method which overcomes the above-referenced problems and others.

SUMMARY OF INVENTION

In accordance with one aspect of the present invention, a method of inserting weatherstripping into channels of frame members is provided. A length of frame material having a channel defined therein is placed on a framing material support with a first end of the framing material disposed against a stop. Weatherstripping is fed from a reel of weatherstripping; a portion of the weatherstripping near the free end is inserted in the channel adjacent a second end of the framing material; and the free end of the weatherstripping is engaged in a movable carriage. The carriage is moved along the framing material support parallel to the framing material, pulling the weatherstripping into the channel. The weatherstripping is released from the carriage and the weatherstripping is cut adjacent the framing material second end.

In accordance with another aspect of the present invention, a weatherstripping insertion machine for inserting weatherstripping into channels in framing material is provided. A framing material support selectively supports a plurality of lengths of framing material. A guide guides free ends of lengths of weatherstripping into a first end of the framing material support. A carriage is mounted for movement along the framing material support between a first position adjacent the first end and a second position adjacent a second end of the framing material support. The carriage selectively receives and grasps the free end of the weatherstripping material when the carriage is disposed in the first position and releases the free end in the second position. A carriage drive assembly moves the carriage from the first position to the second position pulling the weatherstripping second end therewith and pulling the weatherstripping into the channel.

One advantage of the present invention is that it inserts weatherstripping into a plurality of channels concurrently.

Another advantage of the present invention resides in reduced labor overhead.

Another advantage of the present invention resides in its reliability and smooth pneumatic operation.

Still further advantages of the present invention will become apparent to those of ordinary skill in the art upon reading and understanding the following detailed description of the preferred embodiments.

BRIEF DESCRIPTION OF THE DRAWINGS

The invention may take form in various components and arrangements of components, and in various steps and arrangements of steps. The drawings are only for purposes of illustrating a preferred embodiment and are not to be construed as limiting the invention.

DETAILED DESCRIPTION OF THE PREFERRED EMBODIMENTS

Figure 1:
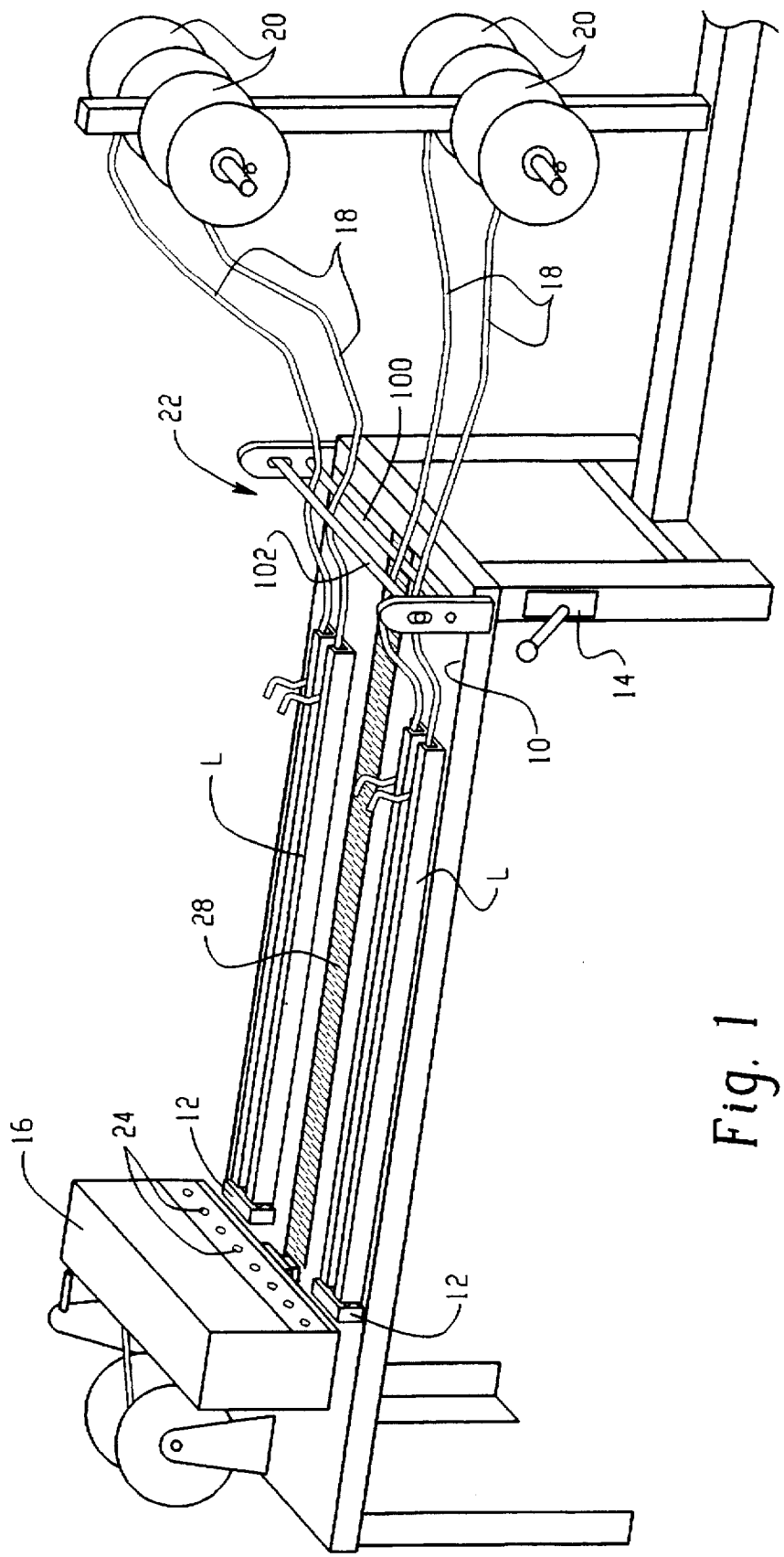
FIG. 1 is a perspective view of an insertion table in accordance with the present invention.

With reference to FIG. 1, a plurality of lengths L of framing stock are positioned on a supporting, table surface 10 with the channel exposed and one end positioned against stops 12. An operator controls a pneumatic switch 14 to cause a puller head 16 to move from its rest position adjacent stops 12 to a position adjacent the opposite end of the framing stock. An operator pulls each length 18 of weatherstripping from a corresponding reel 20 between a pair of pinch rollers 22. The operator inserts a short section of the weatherstripping about a half a dozen inches from the end into the beginning of the channel(s) of one of the framing stock lengths and inserts the free end of the weatherstripping through an aperture 24 into the pulling carriage 16. The operator depresses a button or switch on the pulling carriage 16 causing the pulling carriage to clamp the free ends of the weatherstripping therein. Thereafter, the operator actuates the switch 14 causing the pulling carriage 16 to return to its home position, pulling each of the strips of weatherstripping through their respective channel. When the carriage reaches the home position, its clamp releases. The operator cuts the strips of weatherstripping adjacent the pinch rollers 22, removes the framing pieces from the table top, and repeats the cycle.

Figure 2:
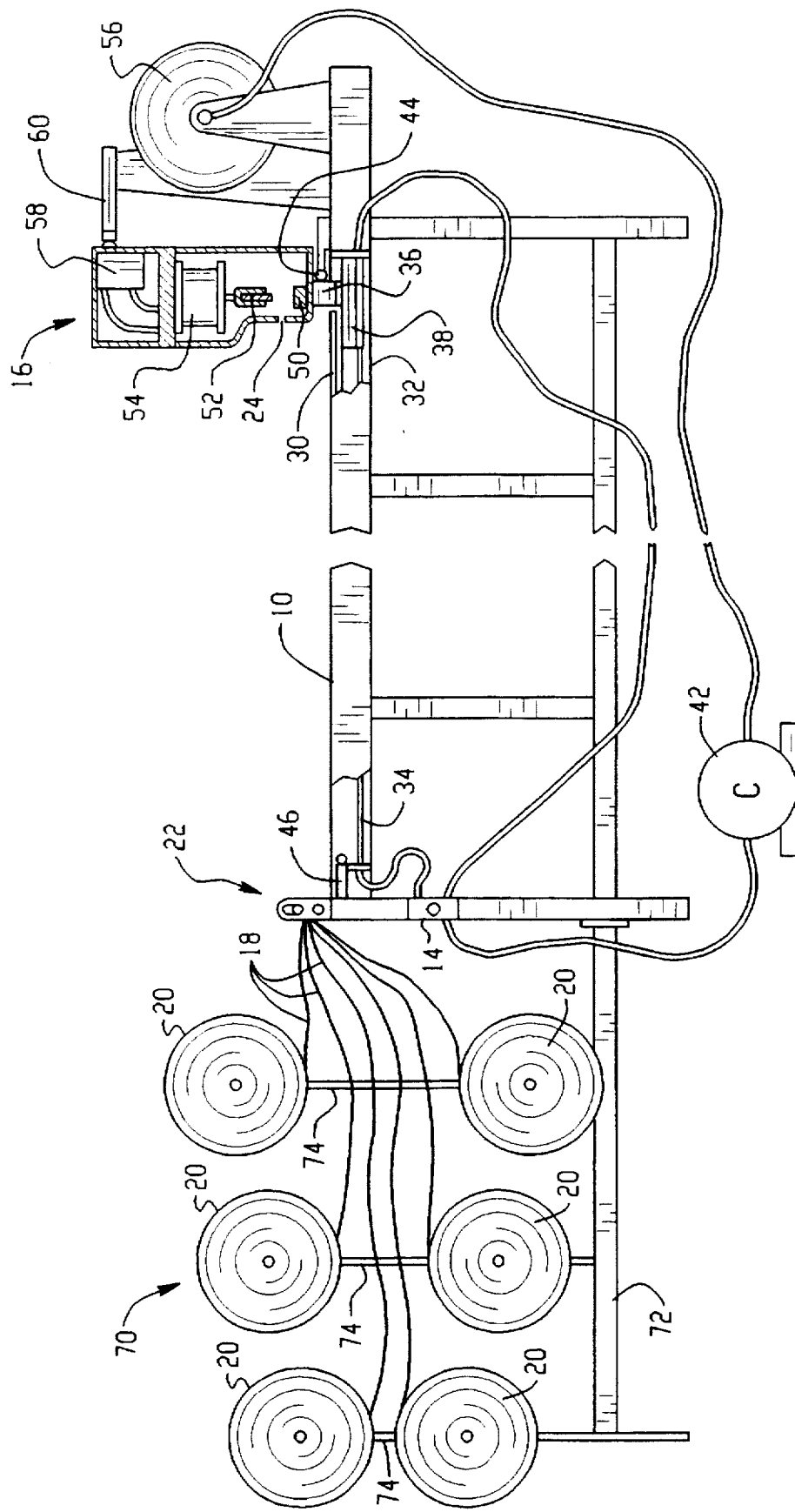
FIG. 2 is a side view in partial section of the insertion table of FIG. 1 and a weatherstripping feed assembly.
Figure 3:
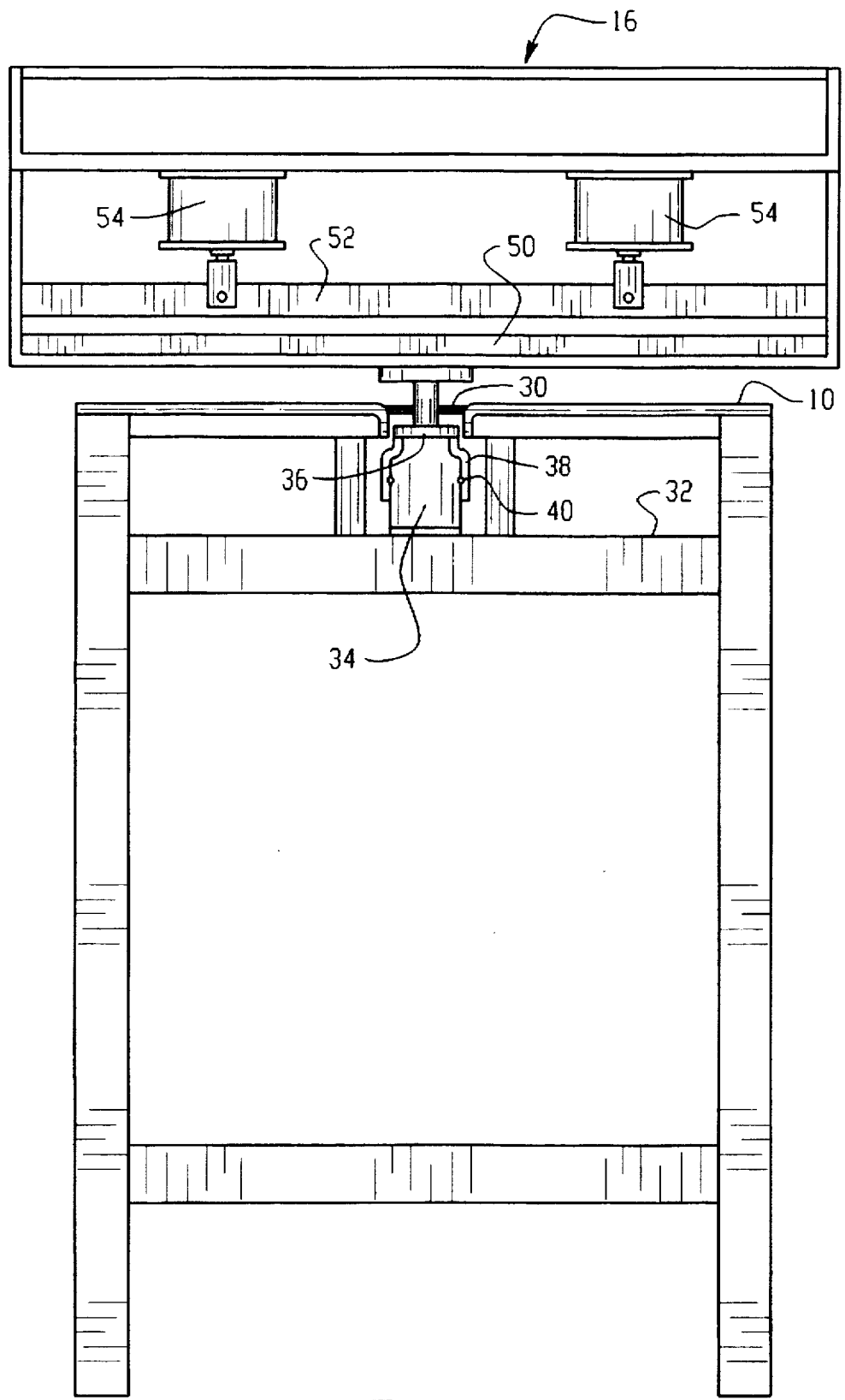
FIG. 3 is a transverse sectional view of the table of FIGS. 1 and 2.

With continuing reference to FIG. 1 and particular reference to FIGS. 2 and 3, the table defines a central, axial slot 28 which is covered by a pair of strips of abutting brushes 30 extending from opposite sides. Below the slot, the table includes a support channel or surface 32 on which a rodless cylinder 34 is mounted. A rodless cylinder is selected which has a travel commensurate with the length of the framing sections within which the weatherstripping is to be inserted, typically about 16 feet. The rodless cylinder includes an internal piston member which divides the cylinder into two air chambers. Differential air pressure applied into the two chambers urges the piston to move along the cylinder. The piston is mechanically attached to a floating mount 36 which moves with the piston along the exterior of the cylinder. For improved stability, the floating mount includes a pair of saddle members 38 which extend around either side of the cylinder. The saddle member and the outer walls of the cylinder 34 include appropriate grooves to receive a pair of self-lubricating bearing rods 40. Other guide or roller assemblies can also be used for both lateral and axial stability.

A pneumatic control system includes a source of compressed air 42 which is connected to the control valve 14. The control valve selectively channels the compressed air into opposite ends of the rodless cylinder 34 to balance the pressure on the piston or create selected pressure differentials thereacross. When the rodless cylinder reaches either extreme of travel, a shock absorbing bumper 44, 46 stops its travel. More specifically, each shock absorbing bumper includes a resiliently biased piston which engages the carriage and slows it as the piston compresses an associated mechanical or pneumatic spring. When the pressure exerted by the piston of the shock absorbing bumper brings the pressure across the cylinder piston into equilibrium, the carriage assembly stops. Preferably, the pressure differential is sufficiently low that an operator can hold the carriage against movement in an emergency.

The carriage 16 is rigidly mounted to the floating mount 36. The interconnection between the carriage and the floating mount extends between the brushes 30. This mounting pushes the brushes aside as it moves between them. When the mounting assembly is not between the brushes, the brushes firmly engage each other to prevent the framing members from falling through the gap and to prevent the operator's hands from reaching into the rodless cylinder in front of a moving carriage.

Behind the plate which defines the apertures 22, the carriage includes a platen 50 against which a movable clamping member 52 is selectively pressed by pneumatic cylinders 54. Preferably, the platen 50 is constructed of or coated with a firm, but resilient material. The ends of the weatherstripping material received through the apertures extend between the platen and the clamping member 52. When the cylinders 54 are actuated, the ends of the weatherstripping are firmly clamped. The resiliency of the platen accommodates weatherstripping of different thicknesses or dimension. Preferably, the clamping member 52 includes a grip improving surface facing toward the platen. Suitable grip improving surfaces include a series of teeth, preferably a two-dimensional array of teeth as on the face of a file, pins, engaging points, rubber edging, or other types of grip improving surfaces.

A reel of pneumatic tubing 56 is connected between the source 42 of compressed air and the carriage 16. One end of the pneumatic line on the reel is connected with a pneumatic valve 58 mounted on the carriage 16. As the carriage moves, the reel 56 unreels and reels in the pneumatic line. The clamping valve 58 is depressed by the operator when the carriage 16 is disposed toward the pinching rollers 22. Once the valve is depressed, the cylinders continue to hold the clamping member and platen in a clamping arrangement. Preferably, the clamping valve 58 is positioned such that the portion of the valve which releases the cylinders and lifts the locking member is engaged by an abutment 60 mounted to the table when the carriage reaches its home position. In this manner, the clamping member releases automatically after the weatherstripping has been pulled completely through the channel and the carriage has returned to its home position.

Figure 4:
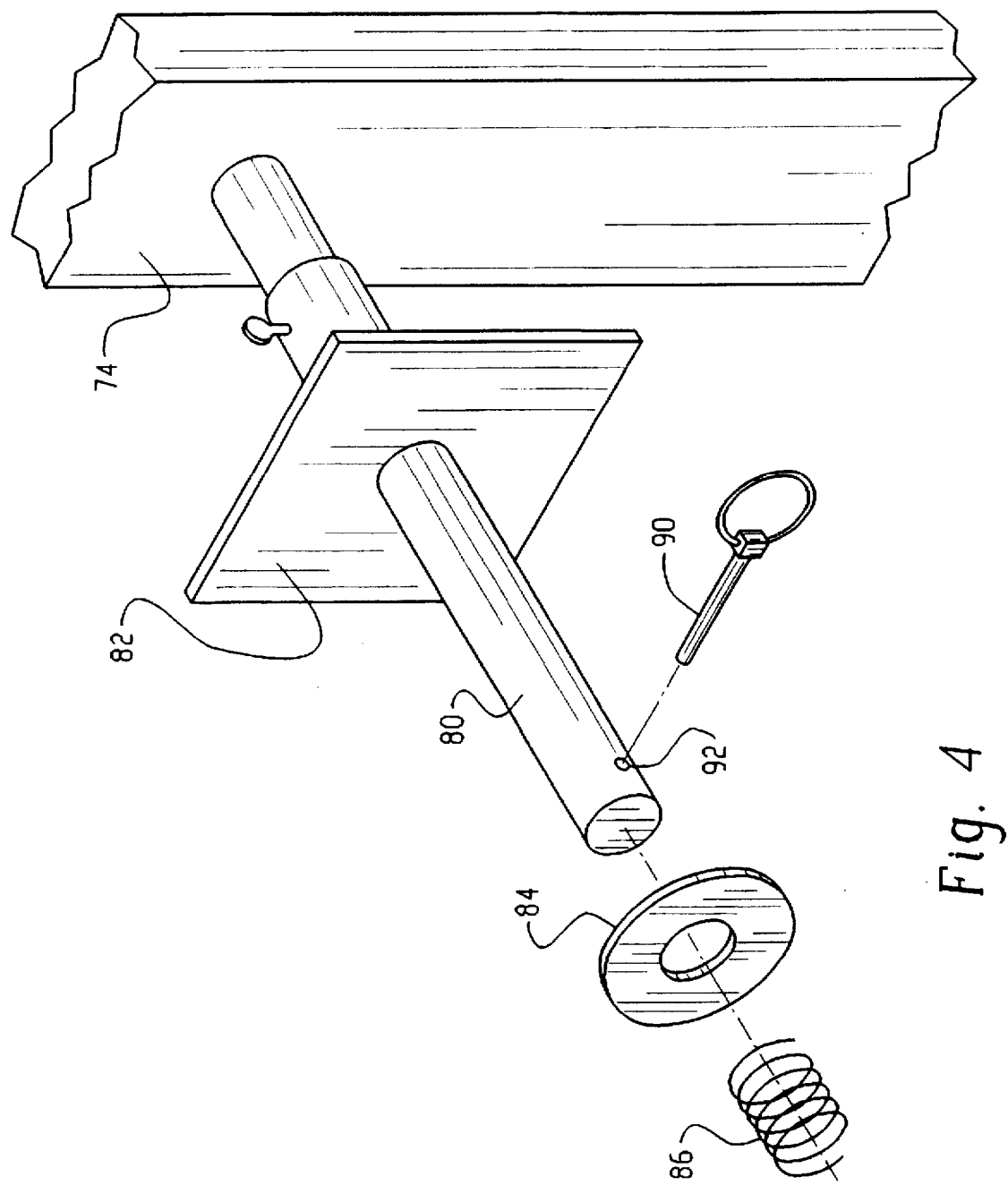
FIG. 4 illustrates details of a mounting and brake assembly for reels of weatherstripping.

With continuing reference to FIG. 2 and further reference to FIG. 4, the reels 20 of weatherstripping are mounted on a tree assembly 70. The tree assembly includes a base member 72 and a plurality of uprights 74. Each of the uprights 74 includes two pairs of reel mounting pins or axles 80. An adjustable drag or braking assembly includes and adjustable friction stop 82 which is adjustably positioned on the pin 80. A reel of weatherstripping is mounted on the pin and an annular rotatable abutting surface 84 is slid over the pin abutting an opposite side of the reel. A spring 86 biases the abutting surface 84 against the reel. A locking key 90 is inserted through a bore 92 in the pin compressing the spring. The position of the friction stop 82 is adjusted and fixed with a set screw to select an amount of braking or drag. The reels should rotate sufficiently freely that they do no impair the feeding of the weatherstripping through the pinch rollers 22. Yet, there should be sufficient drag or braking force on the reels that when the carriage 16 reaches the home position, the reels do not continue to spin.

The pins 80 are connected in progressively more divergent positions on the uprights 74 with such positioning that the weatherstripping on each upper reel passes over the more forward reels and the weatherstripping on the lower reels passes under the reels closer to the insertion table. Optionally, the weatherstripping from the upper reels passes under a guide member 94 and the weatherstripping from the lower reels passes over the guide member. In this manner, all the weatherstripping passes into the pinching rollers 22 at substantially the same angle.

The pinch roller assembly 22 includes a lower roller 100 and an upper roller 102, between which the weatherstripping passes. The upper roller is mounted in a slot to enable it to move up and down. The weight of the upper roller urges it firmly, but gently, against the lower roller. Sufficient pressure is provided that after the weatherstripping is cut, the free ends are retained between the rollers, without damaging the weatherstripping.

Various additional peripheral equipment to facilitate bringing the frame sections to the support surface 10 for weatherstripping insertion and for removal of frame members with inserted weatherstripping are also contemplated. For example, a shelf or conveyor may be disposed on the opposite side of the table from the operator to receive the frame sections with inserted weatherstripping. Alternately, a cart with a frame member receiving rack substantially the same height as the table surface 10 may be disposed adjacent the far side of the table. Various inserts and tooling members can be mounted to the table surface to simplify the handling of different framing stock shapes.

The invention has been described with reference to the preferred embodiment. Obviously, modifications and alterations will occur to others upon reading and understanding the preceding detailed description. It is intended that the invention be construed as including all such modifications and alterations insofar as they come within the scope of the appended claims or the equivalents thereof.

Having thus described the preferred embodiment, the invention is now claimed to be:

1. A method of inserting weatherstripping into channels of framing material, the method comprising:

placing a plurality of lengths of framing material each having a channel defined therein on a framing material support with a first end of the framing material lengths disposed against a stop;

feeding the weatherstripping from a plurality of reels through a pair of pinching rollers disposed adjacent a framing material length second end, inserting the weather stripping in each of the channels adjacent the second end, and engaging the free ends of the weatherstripping in a movable carriage;

moving the carriage along the framing material support parallel to the framing material lengths pulling the weatherstripping into the channels; and, releasing the weatherstripping from the carriage, cutting the weatherstripping adjacent the framing material length second ends, and pinching the weather stripping between the pinch rollers such that after the weatherstripping is cut, the pinching rollers hold the free ends of the weatherstripping conveniently adjacent the support surface in preparation for another cycle.

2. A method of inserting weatherstripping into channels of framing material, the method comprising:

placing a plurality of lengths of framing material each including a channel on the framing material support with a first end of the framing material lengths disposed against a stop;

feeding a plurality of lengths of weatherstripping from a plurality of reels;

starting a portion of one of the lengths of weatherstripping in each of the channels adjacent to a second end of each framing material lengths;

clamping free ends of the lengths of weatherstripping in a movable carriage;

moving the carriage along the framing material support parallel to the framing material pulling the weatherstripping into the channels;

braking the weather stripping reels to prevent the reels from continuing to unroll weatherstripping after the carriage has stopped; and, releasing the weatherstripping from the carriage and cutting the weatherstripping adjacent the framing material lengths second ends.

3. A method of inserting weatherstripping into channels of framing material, the method comprising:

placing lengths of framing material having a channel defined therein on a framing material support with a first end of the framing material disposed against a stop;

feeding weatherstripping from reels of weatherstripping, inserting a portion of the weatherstripping near a free end thereof in each channel adjacent second ends of the framing material, and engaging the free end of the weatherstripping in a movable carriage that is supported by a piston of a rodless cylinder that extends the length of the framing material lengths;

creating a pressure differential across the piston of the rodless cylinder to which the carriage is attached pneumatically moving the carriage along the framing material support parallel to the framing material lengths pulling the weatherstripping into the channels;

releasing the weatherstripping from the carriage and cutting the weatherstripping adjacent the framing material second end, and creating an opposite pressure differential across the piston of the rodless cylinder moving the carriage back to a position adjacent the framing material second ends in preparation for another cycle.

4. The method as set forth in claim 3 wherein the step of engaging the free ends of the weatherstripping in the carriage includes pneumatically clamping the weatherstripping material between a clamping member and a platen.

5. The method as set forth in claim 4 further including:

stopping travel of the carriage at opposite ends of the pistonless cylinder by contacting shock absorbing bumpers which offset the pressure differential and provide a positive stop for the carriage at either end.

6. A weatherstrip insertion machine for inserting weatherstripping into channels in framing material, the machine comprising:

a framing material support on which a plurality of lengths of framing material are selectively supportable;

a tree for supporting a plurality of reels of weatherstripping material, the tree including a plurality of vertical members from which pairs of horizontal pins extend for receiving reels of weatherstripping material rotatably thereon;

a guide which guides free ends of lengths of weatherstripping to a first end of the framing material support;

a carriage which is mounted for movement along the framing material support between a first position adjacent the first end and second position adjacent a second end of the framing material support, the carriage selectively receiving and grasping the free end of the weatherstripping material when the carriage is disposed in the first position and releasing the free end in the second position;

a carriage drive assembly which moves the carriage from the first position to the second position, pulling the weatherstripping therewith and pulling the weatherstripping into the channels; and, a brake assembly for each of the reels which brake assembly stops the reels from rotating when the carriage reaches the second position.

7. A weatherstrip insertion machine for inserting weatherstripping into channels in framing material, the machine comprising:

a framing material support on which a plurality of lengths of framing material are selectively supportable;

a tree for supporting a plurality of reels of weatherstripping material, the tree including a plurality of vertical members from which pairs of horizontal pins extend for receiving reels of weatherstripping material rotatably thereon;

an adjustable brake mounted to each pin which provides an adjustable braking drag for adjustably limiting rotational inertial movement of each weatherstripping reel, said brake includes: an adjustable friction stop, a rotatable disk disposed on the pin on an opposite side of the reel from the friction stop, a spring for biasing the rotatable disk toward the reel of weatherstripping, and a key which is received in a bore along the pin to hold the spring compressed against the rotatable disk;

a guide which guides free ends of lengths of weatherstripping to a first end of the framing material support;

a carriage which is mounted for movement along the framing material support between a first position adjacent the first end and second position adjacent a second end of the framing material support, the carriage selectively receiving and grasping the free end of the weatherstripping material when the carriage is disposed in the first position and releasing the free end in the second position; and, a carriage drive assembly which moves the carriage from the first position to the second position, pulling the weatherstripping therewith and pulling the weatherstripping into the channels.

8. A weatherstrip insertion machine for inserting weatherstripping into channels in framing material, the machine comprising:

a framing material support on which a plurality of lengths of framing material are selectively supportable;

a guide which guides free ends of lengths of weatherstripping to a first end of the framing material support;

a carriage which is mounted for movement along the framing material support between a first position adjacent the first end and second position adjacent a second end of the framing material support, the carriage selectively receiving and grasping the free end of the weatherstripping material when the carriage is disposed in the first position and releasing the free end in the second position, the carriage assembly including:

an elongated platen and an elongated clamp member which matingly engage to grasp the weather stripping free ends therebetween, a pair of pneumatic cylinders connected to the clamping member by a pivotable connection for selectively driving the clamping member and the platen together;

a carriage drive assembly which pneumatically moves the carriage from the first position to the second position, pulling the weatherstripping therewith and pulling the weatherstripping into the channels.

9. The machine of claim 8 further comprising a take-up reel for pneumatic tubing connected between a source of compressed air and the carriage, said reel unreels and reels the pneumatic line as the carriage moves.

10. The machine for claim 9 further comprising a first clamping valve which is depressed to cause the pair of pneumatic cylinders to drive said movable clamping member and said platen in a clamping arrangement, a release valve for releasing said pneumatic cylinders to lift a clamping member, the release valve being engaged by an abutment which is engaged when the carriage reaches the second position.

11. A weatherstrip insertion machine for inserting weatherstripping into channels in framing material, the machine comprising:

a framing material support on which a plurality of lengths of framing material are selectively supportable;

a carriage which is mounted for movement along the framing material support between a first position adjacent the first end and second position adjacent a second end of the framing material support, the carriage selectively receiving and grasping the free end of the weatherstripping material when the carriage is disposed in the first position and releasing the free end in the second position;

a carriage drive assembly for moving the carriage from the first position to the second position, pulling the weatherstripping therewith and pulling the weatherstripping into the channels, the drive assembly including a rodless cylinder mounted under the framing material support and extending from adjacent the second end, the rodless cylinder including a piston member to which the carriage is attached such that the rodless cylinder is commensurate in length with the framing material support and the piston has a travel commensurate with the framing material support.

12. The machine as set forth in claim 11 further including:

a pair of shock absorbing bumpers disposed adjacent the first and second ends of the framing material supporting structure for each engaging the carriage to stop the travel thereof.

13. The machine as set forth in claim 11 further including:

a control valve connected between a source of pressurized fluid and opposite ends of the rodless cylinder for selectively adjusting a pressure differential across the piston.

14. The machine as set forth in claim 11 wherein the carriage includes:

a cradle which extends over and around opposite sides of the rodless cylinder; and guides disposed between the cradle and the opposite sides of the rodless cylinder.

15. The machine as set forth in claim 11 wherein the carriage includes:

a platen;

a clamping member which selectively engages the platen; and, at least one fluidic cylinder for selectively controlling the clamping member.

16. A weatherstrip insertion machine for inserting weatherstripping into channels in framing material, the machine comprising:

a framing material support on which a plurality of lengths of framing material are selectively supportable;

a guide which guides free ends of lengths of weatherstripping to a first end of the framing material support;

a carriage mounted for movement along the framing material support between a first position adjacent the first end and second position adjacent a second end of the framing material support, the carriage selectively receiving and grasping the free ends of the weatherstripping material when the carriage is disposed in the first position and releasing the free ends in the second position, the carriage including:

a platen;

a clamping member which selectively clamps the ends of the weatherstripping material between itself and the platen; and, a pair of fluidic cylinders pivotally connected to the clamping member for selectively urging the clamping member against the platen;

a carriage drive assembly which moves the carriage from the first position to the second position, pulling the weatherstripping therewith and pulling the weatherstripping into the channels.

17. The machine as set forth in claim 16 further including:

a valve for operating the fluidic cylinder, the valve being disposed on the carriage; and a member supported on the framing material support for engaging the valve adjacent the framing material support second end for causing the valve to adjust the fluid pressure supplied to the fluidic cylinder to lift the clamping member releasing the clamped weatherstripping material.

18. The machine as set forth in claim 17 wherein the guide includes a pair of rollers which pinch the weatherstripping material therebetween.

19. The machine as set forth in claim 16 wherein the guide includes a pair of rollers which pinch the weatherstripping material therebetween.

* * * * *